Oct. 19, 1948. E. J. SWEENEY 2,451,783
METHOD OF MAKING SKIN-AND-FRAME ASSEMBLIES
Filed Sept. 30, 1944 4 Sheets-Sheet 1

INVENTOR
Edward J. Sweeney
BY John P. Tarbox
ATTORNEY

Oct. 19, 1948.   E. J. SWEENEY   2,451,783
METHOD OF MAKING SKIN-AND-FRAME ASSEMBLIES
Filed Sept. 30, 1944                                   4 Sheets-Sheet 3

INVENTOR
Edward J. Sweeney
BY John P. Tarbox
ATTORNEY

Oct. 19, 1948. E. J. SWEENEY 2,451,783
METHOD OF MAKING SKIN-AND-FRAME ASSEMBLIES
Filed Sept. 30, 1944 4 Sheets-Sheet 4

INVENTOR
Edward J. Sweeney
BY John P. Tarbox
ATTORNEY

Patented Oct. 19, 1948

2,451,783

UNITED STATES PATENT OFFICE 2,451,783

METHOD OF MAKING SKIN-AND-FRAME ASSEMBLIES

Edward J. Sweeney, Philadelphia, Pa., assignor to The Budd Company, Philadelphia, Pa., a corporation of Pennsylvania Application September 30, 1944, Serial No. 556,611

3 Claims. (Cl. 29—148.2)

1

This invention relates to a method of making a skin-blanket and frame assembly and has for an object the provision of improvements in this art.

In the practice of the invention one part of the assembly, such as the frame, is made in one part of a jig or fixture and another part of the assembly, such as the skin-blanket, is made or disposed in another part of the jig or fixture; then the jig parts are brought together in accurate registry with the assembly parts between them; whereupon the parts of the assembly are connected together by working through one jig part and the assembly part carried thereby. After the assembly parts have been secured together, in whole or in part, the jig parts, or some of them, are removed to clear the united assembly. In a convenient embodiment of the invention the frame of the assembly is made in one jig part, with the jig part disposed below the assembly and working from above; and this jig part is inverted and placed upon another jig part in which the skin-blanket is secured. The work assembly parts are thus very rigidly and accurately held in position until after the sub-assemblies are firmly secured together, whereby any tendency toward relative maladjustment of parts, due to springiness, deformation, or other cause, in the intermediate stages of manufacture are avoided.

An illustrative embodiment of the invention will be described in connection with the accompanying drawings, wherein.

Figure 1:
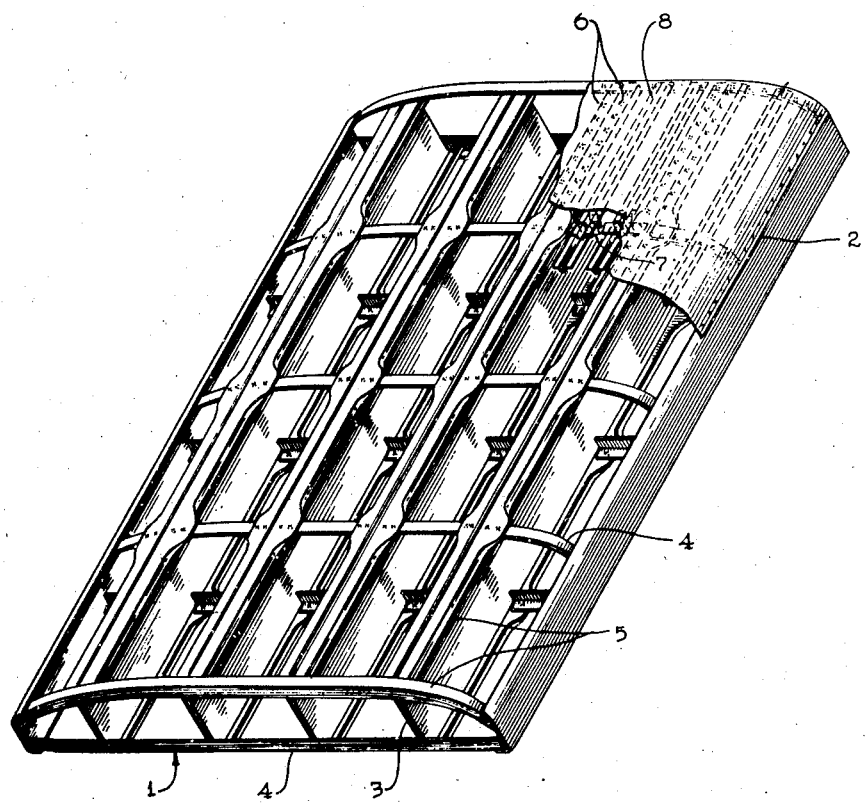
Fig. 1 is a perspective view of the completed structural assembly, parts of the skin sheet being broken away to show the frame.
Figure 2:
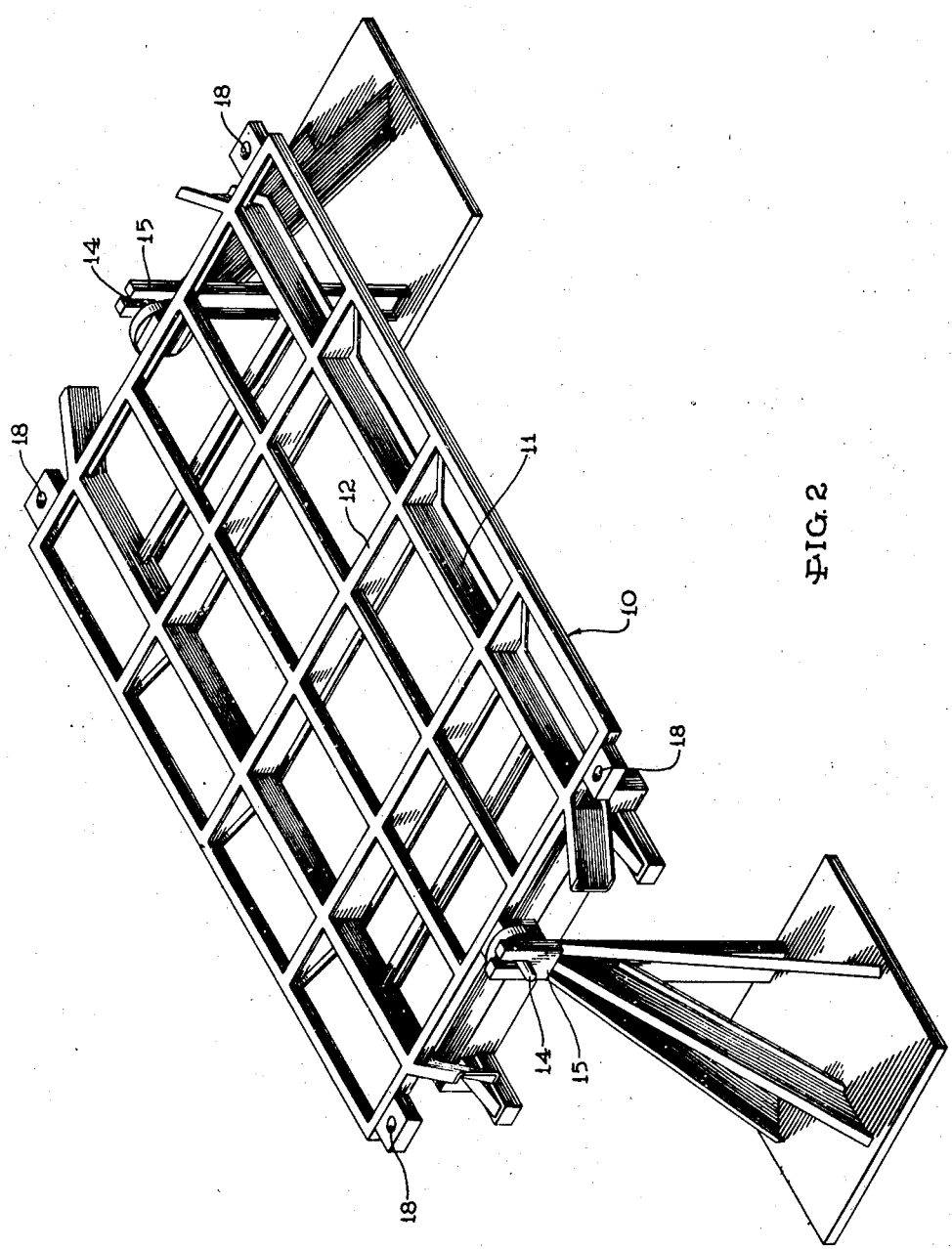
Fig. 2 is a perspective view of a jig or fixture on which the frame is built.

The assembly which is to be built, as shown in Fig. 1, comprises a frame 1 which is covered on one side by a skin sheet blanket 2. This assembly may be used above or may comprise a part of a bipartite assembly which is connected together in the intermediate portion through the frame elements. In any event, the skin sheet prevents full access from one side during the attachment of the skin to the frame when pressure devices such as welding or riveting guns are used to make the attachment.

2

The frame comprises longitudinal beams 3 and transverse beams 4, each having cap strips 5. The longitudinal beams 3 have cap strip flanges on both sides to which the skin sheet is directly attached as by welds 6. The transverse beams 4 have cap strip flanges on only one side and to the straight side of the web opposite the flange there are welded the upper sides of angular clips 7 which are attached to the skin sheet. The skin sheet is previously provided between beams with reinforcing stringers 8. The stringers may be attached by a roller welder while the skin sheet is stretched flat; and the clips 7 may be applied while the skin sheet is disposed in a holding jig with templet bars to gauge the location of the clips.

Figure 3:
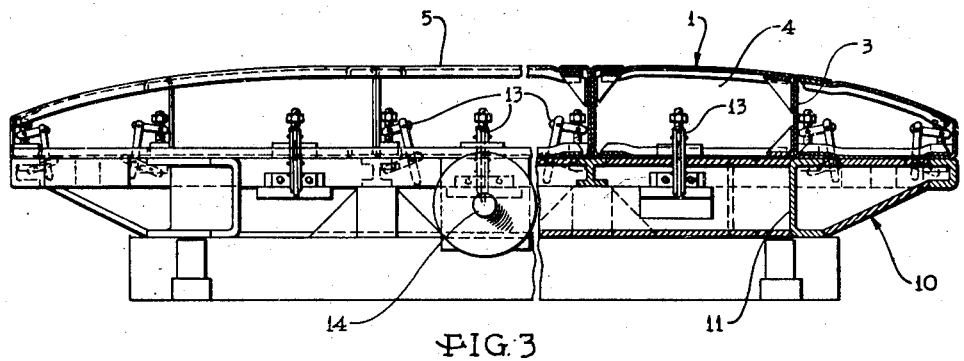
Fig. 3 is a section showing the frame assembled in the frame jig.
Figure 5:
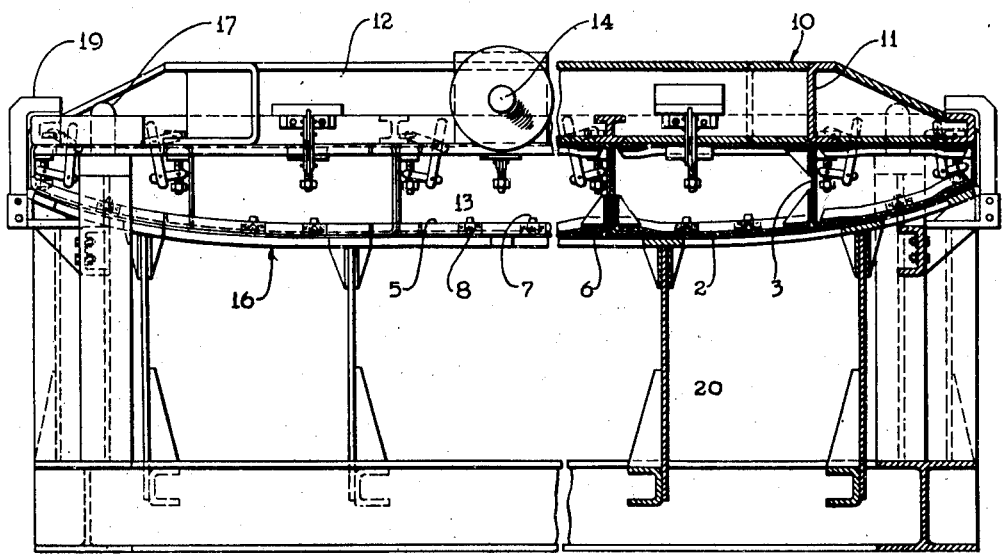
Fig. 5 is a section showing the frame jig and assembly superimposed on the skin sheet jig and the skin sheet therein.
Figure 4:
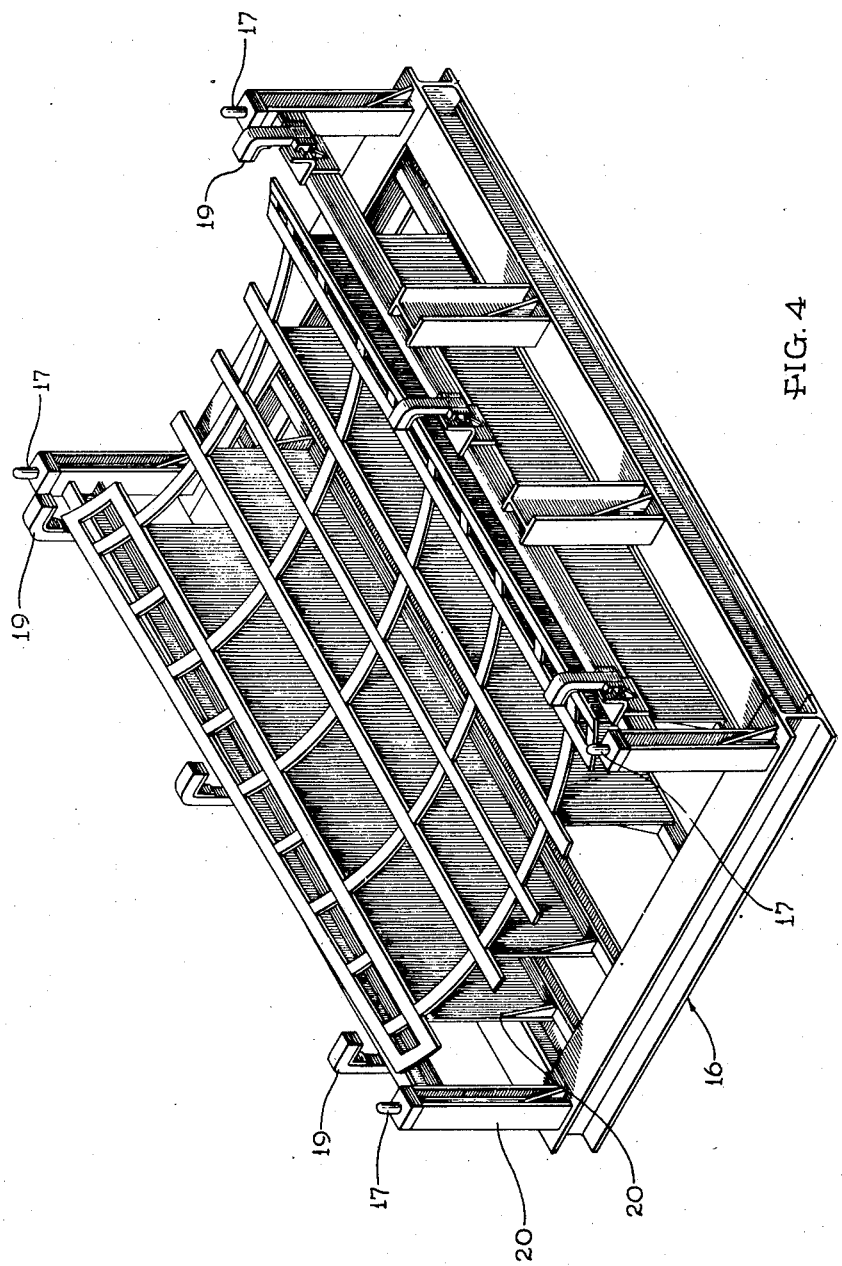
Fig. 4 is a perspective view of a skin sheet supporting jig.

The frame 1 is built in a jig 10 which comprises longitudinal bars 11 and transverse bars 12. The bars 11 and 12 are located where they will coincide with and support the longitudinal and transverse frame beams 3 and 4 respectively; and, as shown in Fig. 3, the beams are secured to the supporting bars of the jig by any suitable means, such as the clamps 13. The requisite kind and number of templet stops for the parts will be provided in the usual manner. For present purposes the stops need not be illustrated; nor need the clamps be shown in all views.

The frame jig 10 is mounted on trunnions 14 at the ends, the trunnions resting in notches in floor stands 15. The jig, thus mounted, can be turned about for convenient access for assembling the frame.

When the frame has been assembled it is turned upside down, together with its jig, by movement about the trunnions 14 and carried by a crane to a position above the skin-blanket 2 which is properly positioned and held in a complementary skin jig 16. To secure accurate registry between the jig elements and the structural assembly parts carried thereby, pins 17 and corresponding holes 18 may be provided on the two jig parts. The frame jig 10 may be held down on the skin jig 16 by clamps 19.

With the frame properly positioned and held in the skin blanket, the clips 7 can be welded to the sides of the beams by reaching through the open-work jig 10 and the open frame with welding gun or tongs, the yoke carrying the vertically disposed welding arms straddling the jig bars and frame beams. This can readily be understood without illustrating the welding tongs. The skin sheet is welded to the flanges of the longitudinal beams by straddling the assembly from one end, one arm of the welding gun or tongs extending beneath the skin sheet between the supports 20 and the other arm extending above the upper jig. Parts on the upper arm can then be extended down between the jig bars and frame beams to make the welds. This also can be readily understood without illustration.

When the frame has been connected to the skin blanket, the upper jig 10 is unclamped from the frame and lifted off, whereupon the structural assembly can be removed.

While one embodiment of the invention has been described for purposes of illustration, it is to be understood that there may be various embodiments within the limits of the prior art and the scope of the subjoined claims.

What is claimed is:

1. A method of making a structural assembly which comprises, securing one sub-assembly including a plurality of connected parts in one jig unit, securing another sub-assembly including a plurality of connected parts in another jig unit, one of the jig units and the sub-assembly carried thereby being reticulated, bringing the jig units together with the sub-assemblies carried thereby into predetermined registering relationship to place the sub-assemblies in proper interrelationship between the jig units, and securing the sub-assemblies together by working through one jig unit and the sub-assembly carried thereby.

2. The method of making a structural assembly comprising a reticulated frame and a skin sheet sub-assembly, which comprises securing one sub-assembly in one jig unit, securing the other sub-assembly in another jig unit, bringing the jig units with the sub-assemblies carried thereby together into predetermined registering relationship to place the sub-assemblies in proper interrelationship between the jig units, and securing the sub-assemblies together by working through the reticulated sub-assembly and its jig.

3. The method of making a structural assembly comprising a reticulated frame and a skin sheet sub-assembly, the skin sheet sub-assembly having pre-attached thereto clips by which it is to be secured to the reticulated sub-assembly, which comprises securing one sub-assembly in one jig unit, securing the other sub-assembly in another jig unit, bringing the jig units with the sub-assemblies carried thereby together into predetermined registering relationship to place the sub-assemblies in proper interrelationship between the jig units, the clips of the skin sub-assemblies being brought into side overlapping relationship with elements of the reticulated sub-assembly when the jig units are brought together, and securing the sub-assemblies together by welding the clips to the adjacent sub-assembly elements by working through the reticulated sub-assembly and its jig.

EDWARD J. SWEENEY.

REFERENCES CITED

The following references are of record in the file of this patent:

UNITED STATES PATENTS

| Number | Name | Date |
|---|---|---|
| 1,271,386 | Tarbox | July 2, 1918 |
| 1,464,910 | Landaw | Aug. 14, 1923 |
| 1,550,651 | Charter | Aug. 18, 1925 |
| 1,595,304 | Hulbert | Aug. 10, 1926 |
| 1,768,049 | Gill | June 24, 1930 |
| 1,877,653 | Fageol | Sept. 13, 1932 |
| 2,110,752 | Wright | Mar. 8, 1938 |
| 2,121,670 | Saives | June 21, 1938 |
| 2,301,636 | Nicol | Nov. 10, 1942 |
| 2,314,319 | Smith | Mar. 16, 1943 |
| 2,342,025 | Watter | Feb. 15, 1944 |
| 2,374,894 | Ploch et al. | May 1, 1945 |
| 2,394,881 | Stuhlfauth | Feb. 12, 1946 |